United States Patent [19]

Blackburn

[11] 4,170,722
[45] Oct. 9, 1979

[54] APPARATUS AND METHOD FOR REMOTE TESTING OF A LOOP TRANSMISSION PATH

[75] Inventor: Tom L. Blackburn, San Jose, Calif.

[73] Assignee: GTE Automatic Electric Laboratories, Incorporated, Northlake, Ill.

[21] Appl. No.: 878,632

[22] Filed: Feb. 17, 1978

[51] Int. Cl.² ............................................. H04B 3/46
[52] U.S. Cl. ........................... 179/175.3 R; 179/2.5 R
[58] Field of Search ....... 179/175.3 R, 2 A, 175.31 R, 179/2.5 R

[56] References Cited

U.S. PATENT DOCUMENTS

| Re. 29,499 | 12/1977 | Spencer | 179/175.3 R |
|---|---|---|---|
| 2,666,099 | 1/1954 | Bonner | 179/175.3 R |
| 3,526,729 | 9/1970 | Andrews, Jr. et al. | 179/175.3 R |
| 3,660,620 | 5/1972 | Schimpf | 179/175.3 R |
| 3,840,706 | 10/1974 | Krasin et al. | 179/2.5 R |
| 3,912,882 | 10/1975 | Beerbaum | 179/175.3 R |
| 4,045,624 | 8/1977 | Browne | 179/175.3 R |

Primary Examiner—Thomas A. Robinson

Attorney, Agent, or Firm—Leonard R. Cool

[57] ABSTRACT

A first network can be switched into and out of connection with a lowpass filter disposed at one of the two opposite carrier terminal ends of a loop transmission path employing a double-sideband carrier. When the filter and network are so connected, an oscillator producing a first test signal of selected frequency and amplitude is formed. This signal modulates the carrier wave generated by the existing carrier oscillator at this terminal end. The modulated signal passes along the path to the opposite terminal end where it is demodulated and detected. The detector threshold is set so that the detector responds to the demodulated first test signal, but does not respond to normal voice and other test signals. The detected demodulated signal energizes the station carrier oscillator at the opposite end whereby its carrier wave is modulated. The resultant second modulated test signal passes back along the path to the original terminal where it is demodulated, and the presence of the carrier is detected. The amplitude of the demodulated signal also may be measured and compared to that of the original test signal to establish the loss in the transmission path.

10 Claims, 7 Drawing Figures

APPARATUS AND METHOD FOR REMOTE TESTING OF A LOOP TRANSMISSION PATH

BACKGROUND OF THE INVENTION

1. Field of the Invention

This invention relates to transmission measurements in carrier telephone circuits, and more particularly to remote loop transmission testing between terminals of a carrier system.

2. Description of the Prior Art

Techniques for the remote measurement of transmission loss, in both directions of transmission through a two-way circuit, have been given considerable attention for a long period of time. For example, in U.S. Pat. No. 2,666,099, issued Jan. 12, 1954, such a testing technique is disclosed. A disadvantage of this technique is that a separate 1000-cycle generator is required at each terminal. A further disadvantage is that some means for adjustment of a variolosser is required at the receiving terminal. Also, external transmission equipment is employed.

One technique for overcoming the requirement for external transmission equipment at one of the two locations is described in U.S. Pat. No. 3,526,729, issued Sept. 1, 1970, entitled "Transmission Measuring System With Harmonic Generating Means". Disadvantages of this technique are the use of a diode across the transmission path or other means for generating harmonics of the test signal, and the use of separate test equipment consisting of an oscillator for generating the test signal and a test meter for measuring the harmonic signal power. An improvement on the technique disclosed in U.S. Pat. No. 3,526,729 is given in U.S. Pat. No. 3,660,620, issued May 2, 1972, entitled "Transmission Measurement With A Two-Component Signal". Disadvantages of this technique are the use of a diode network which is connected across the transmission path and the need for two different oscillators (frequency generators), one of which acts as a carrier frequency.

Another technique is disclosed in U.S. Pat. No. 3,739,107, issued June 12, 1973, entitled "On Premise Telephone Loop Tester". In particular, this reference requires a separate loop tester which in effect closes the tip-and-ring circuit of a telephone line to simulate an "off-hook" condition. Further, the loop tester must be deactivated during normal use of the telephone in order to prevent actuation by voice energy. The predetermined audio tone transmitted from the central office to the subscriber station is also external to the telephone transmission equipment.

SUMMARY OF THE INVENTION

Apparatus for remote testing of the loop transmission path between first and second terminals of a carrier system includes a network disposed in each channel at the first terminal which is connectable to an existing lowpass filter. When so connected, an oscillator is formed which generates a first audio test signal having a predetermined amplitude which is much higher than the normal signals present in the system and having a frequency that is within the passband of the carrier channel. This first signal modulates the carrier of a channel oscillator disposed at the first terminal and is transmitted as a modulated signal via the carrier channel to the second terminal end where it is demodulated. The demodulated test signal passes through a threshold detector. The detected signal is connected so as to energize the transmitting oscillator at the other terminal end, thus simulating an artificial seizure of the drop. This causes operation of the signaling equipment at the first terminal end. An indication circuit within the channel signaling path is employed to indicate that the loop is operational. The detected test signal also modulates the carrier of the transmitting oscillator, thus producing a second modulated test signal which passes in reverse direction along the channel to the first terminal whereat it is demodulated. The amplitude of this demodulated signal can be measured to establish the loss in the loop transmission path.

DETAILED DESCRIPTION OF THE PREFERRED EMBODIMENTS

Figure 1:
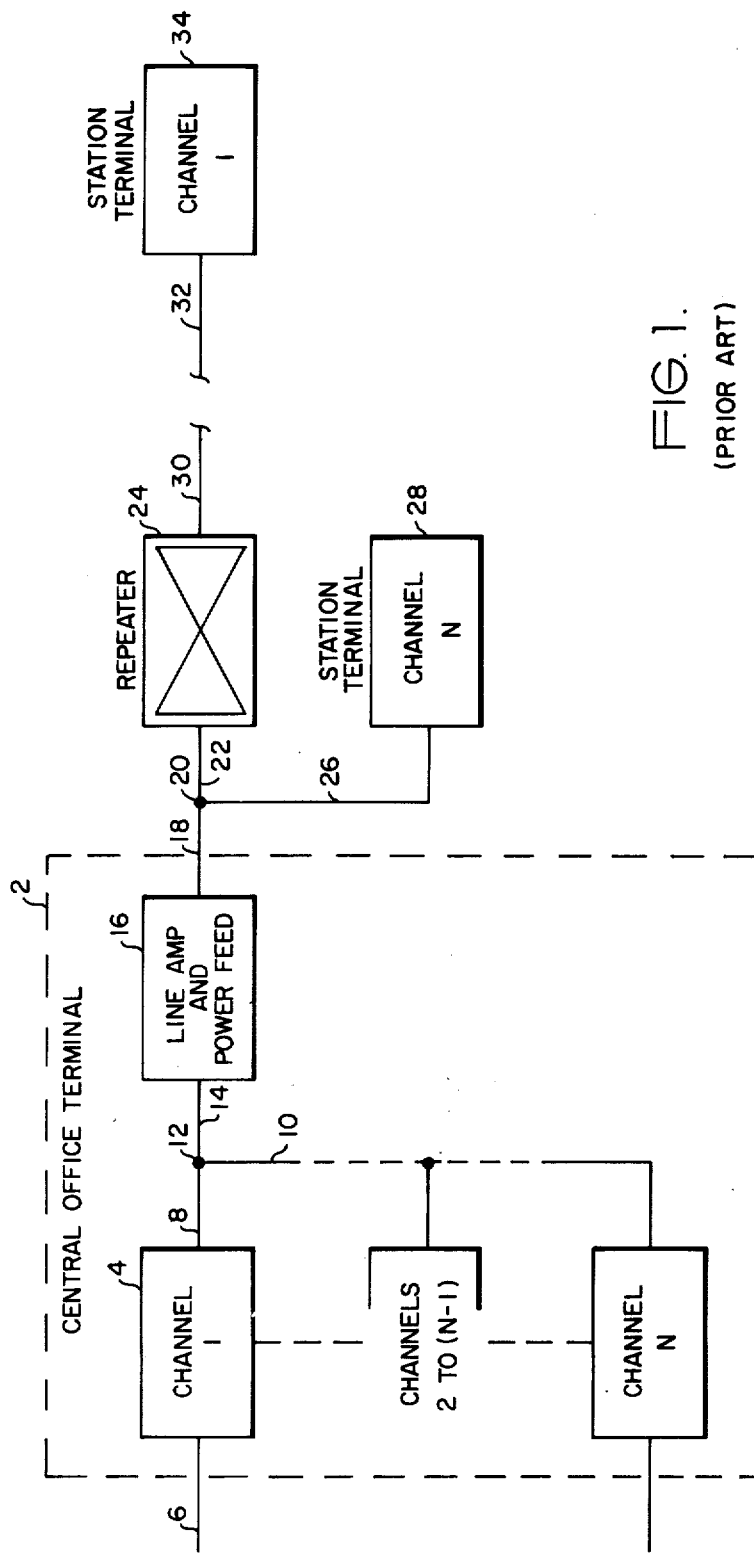
FIG. 1 is a generalized block diagram of a prior-art station carrier system.

The purpose of the invention is to determine the loop continuity between an attended terminal and a remote terminal by testing only from the attended terminal end. In addition to loop continuity, it is also possible to determine certain transmission characteristics remotely. One environment in which a preferred embodiment of the instant invention operates is shown in FIG. 1 where a station carrier system is illustrated. At the central office end, a plurality of carrier channels are illustrated which provide transmission to remote station terminals such as 34 and 28. While not shown in the drawing, the modulation is of the amplitude modulation form with a double sideband transmitted carrier. Further, as is well known, the remote station terminals, such as 28 and 34, use the transmitted carrier for transmission of signaling information, such as dial pulsing and channel status. In fact, an idle condition is indicated by the absence of carrier since the local oscillator in the station terminal channels is not operating unless the associated telephone station set creates an off-hook condition. A repeater 24 is shown in the transmission path between the central office terminal and the station terminal channel 34. This is to illustrate the extension which is normally obtainable in carrier transmission systems and which is well known. A plurality of channels, such as are shown, are not necessary to the invention since the invention is separately employed in individual carrier channels.

Figure 2:
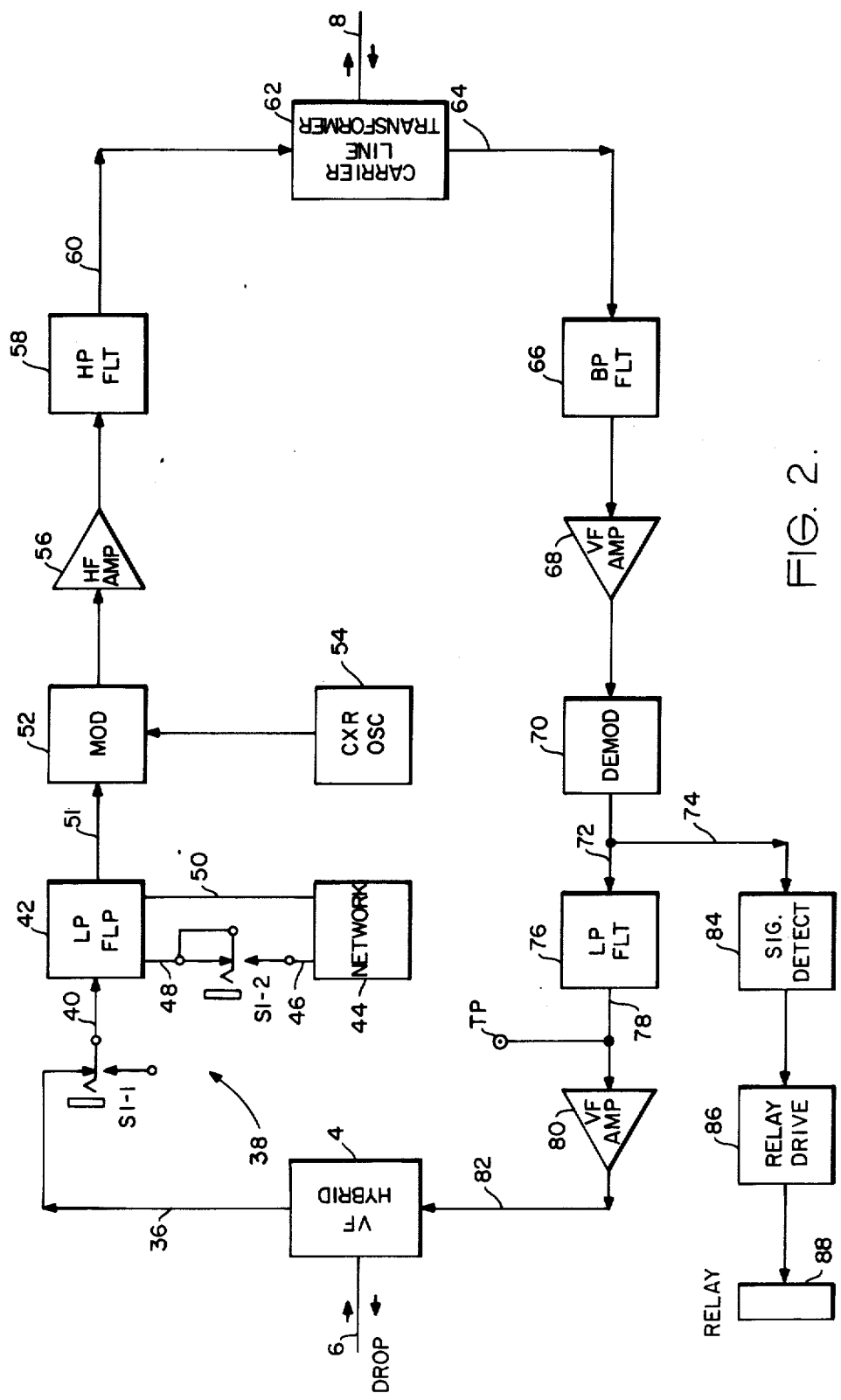
FIG. 2 is a block diagram of a central office channel unit such as may be used in the system shown in FIG. 1, but including a network connectable to the transmitting lowpass filter.

A central office end of a channel (CO unit), such as may be employed in a station carrier system, is shown in FIG. 2. Most elements of the CO unit are conventional, however, the unit has been modified to include the CO unit end of one embodiment of the invention. Essentially, this consists of switch S1 and network 44 which is connectable to transmitting lowpass filter 42 and, when so connected, converts the lowpass filter 42 into an oscillator for transmission of an audio test signal. In normal operation, voice frequencies enter and leave the VF hybrid 4 on a bi-directional basis over path 6. The transmitting output of hybrid 4 passes along path 36 via a normally closed contact of switch S1-1 to path 40 and to the input of lowpass filter 42. As is well known, filter 42 restricts the voice frequencies to the desired passband and passes these along path 51 to one input of modulator 52. The channel carrier frequency is determined by carrier oscillator 54 which applies the carrier frequency to a different input of modulator 52. The modulated output is amplified in high-frequency amplifier 56. The resultant signal is filtered in high-pass filter 58 and passes via path 60 to carrier line transformer 62 and is there coupled to the carrier frequency line via path 8. Incoming signals from the carrier frequency line 8 pass via transformer 62 and path 64 to bandpass filter 66. Bandpass filter 66 selects only those frequencies which are applicable to the particular channel in question. The frequencies selected by bandpass filter 66 pass through high-frequency amplifier 68 and are demodulated (detected) in demod 70. The output of demod 70 is connected both to lowpass filter 76, which restricts the frequencies to those below the frequency of the carrier, and to sig detect 84. The sig detect 84 detects the presence of the transmitted carrier from the station terminal (remote terminal end) and applies this signaling information to relay drive circuit 86, which has an output connected to relay 88. Relay drive circuit 86 may have an indication device, such as a light emitting diode, not shown, connected so as to give an indication when the relay is operated. Other techniques may also be employed. In the loop test mode, this is indicative of a reliable transmission path from the station terminal. Lowpass filter 76 selects only the lower sideband of the demodulated signal and passes this via AMP 80, path 82 and VF hydrid 4 to the drop via path 6. A test point is connected on path 78 so as to permit measurement of the received voice frequency amplitude during the test mode.

When switch S1 is depressed, path 36 between VF hybrid 4 and path 40 is interrupted so as to prevent any signals from the drop passing through the transmitting portion of the central office channel during test. In addition, the network 44 is connected to lowpass filter 42 via paths 46 and 48. As will be shown hereinafter, the connection of network 44 causes lowpass filter 42 to oscillate at a predetermined frequency and amplitude (first audio test signal), providing an output signal in the form of square waves. The output signal from lowpass filter 42 (oscillator) is applied to the modulator 52 and, as previously described, passes out in modulated form through transformer 62 along the path 8 to the receiving terminal. If the integrity of the transmission path to the receiving terminal is intact, the presence of this signal having a predetermined frequency and amplitude will operate to turn on the station oscillator at the station end and, thus, transmit this station carrier signal modulated by the audio test signal generated by lowpass filter (oscillator) 42, as will be described in more detail below.

Figure 3:
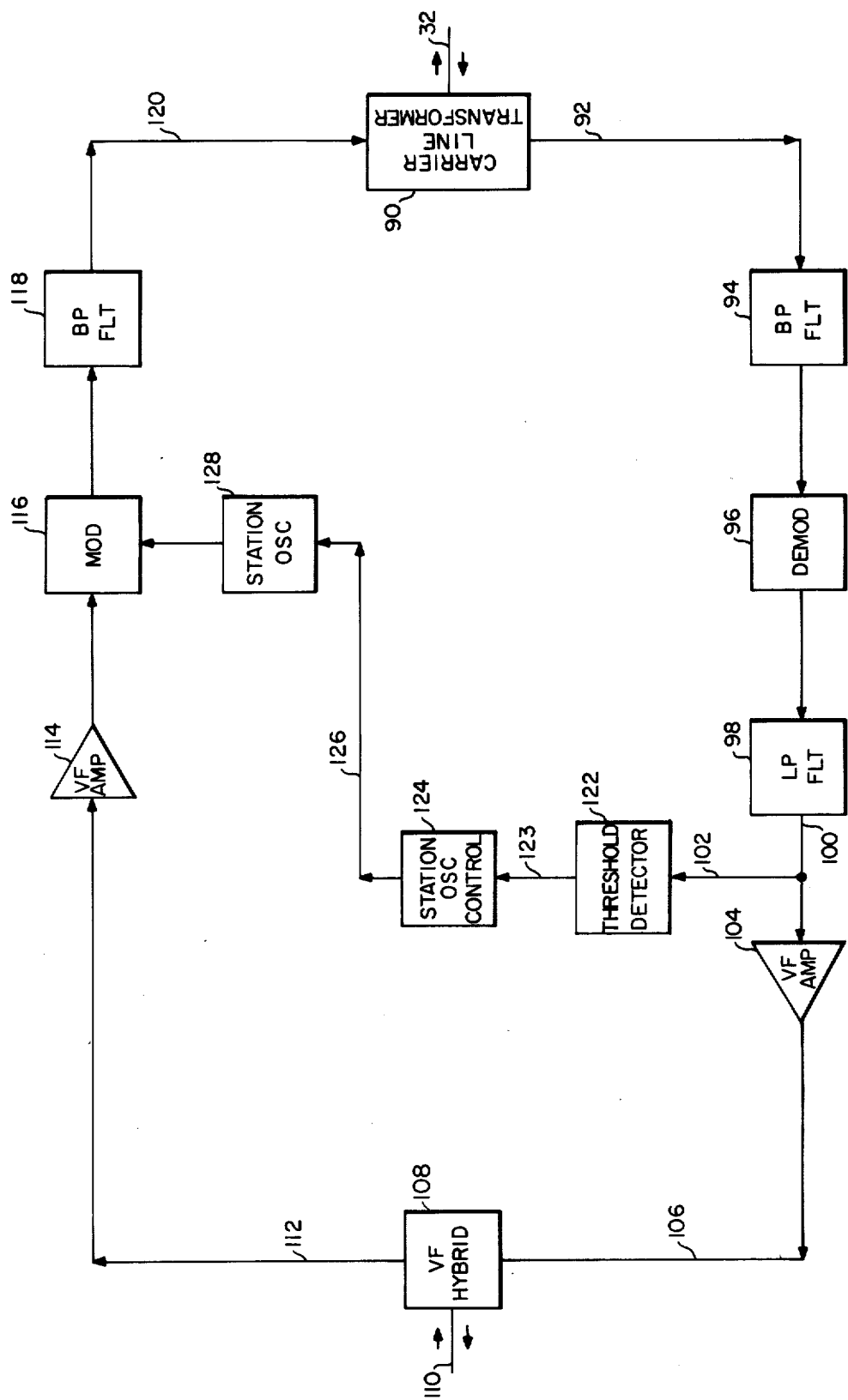
FIG. 3 is a block diagram of a subscriber station unit such as is shown in FIG. 1, but including the threshold detector and station oscillator control network.

Referring now to FIG. 3, the manner in which the incoming signals cause the transmission of information back to the transmitting terminal may be seen. The received signals on path 32 pass through carrier line transformer 90 and path 92 to bandpass filter 94, where only those signals associated with this channel are selected. These selected signals are passed to demodulator (detector) 96, lowpass filter 98, VF amplifier 104, path 106 to the VF hybrid 108, and path 110 to the subscriber's telephone station. These signals from the output of lowpass filter 98 on path 100 are also applied to the input of threshold detector 122 via path 102. The threshold level of threshold detector 122 is set so as to respond only to the first audio test signal which is in the order of 10 dB higher than even the normal test signal which may be applied. The amplitude is in the order of +10 dBm 0 at about 3 kHz, as compared with the normal test tone level of 0 dBm 0 at 1 kHz. This is necessary so as to prevent an output from the threshold detector 122 for any signal normally appearing on the line. Actual operation of threshold detector 122 will be discussed in connection with FIG. 7 subsequently. When the first audio test signal is present, threshold detector 122 produces an output signal which is applied to station oscillator control 124, which, in turn, applies an operating voltage over path 126 to the station oscillator 128. When this voltage appears on path 126, the station oscillator is turned on and transmits a signal, i.e., the carrier, via modulator 116, bandpass filter 118, path 120, carrier line transformer 90, and path 32 to the central office terminal. The presence of the oscillator signal at the central office terminal is indicative of an operational subscriber loop. An additional test may be employed to determine if the transmission levels are satisfactory. Here it is only necessary to measure the amplitude of a return test signal. It is to be noted that the voice frequency test signal will then pass through VF amplifier 104, VF hybrid 108, which is unterminated, path 112, VF amplifier 114 to an input terminal modulator 116. Since the oscillator has been turned on by the presence of the first audio test signal, this detected signal modulates the carrier obtained from station oscillator 128 and, thence, passes as a carrier frequency through bandpass filter 118, path 120, carrier line transformer 90, and path 32 back to the central office terminal. Hence, a second test signal is derived from the first test signal. The amplitude of this second test signal is known and, therefore, the level of the signal which should be received at the output of the lowpass filter 76 (FIG. 2) is also known. Thus, a measurement of the signal level at test point TP, FIG. 2, will indicate whether or not the transmission loss of the loop is correct.

Figure 4:
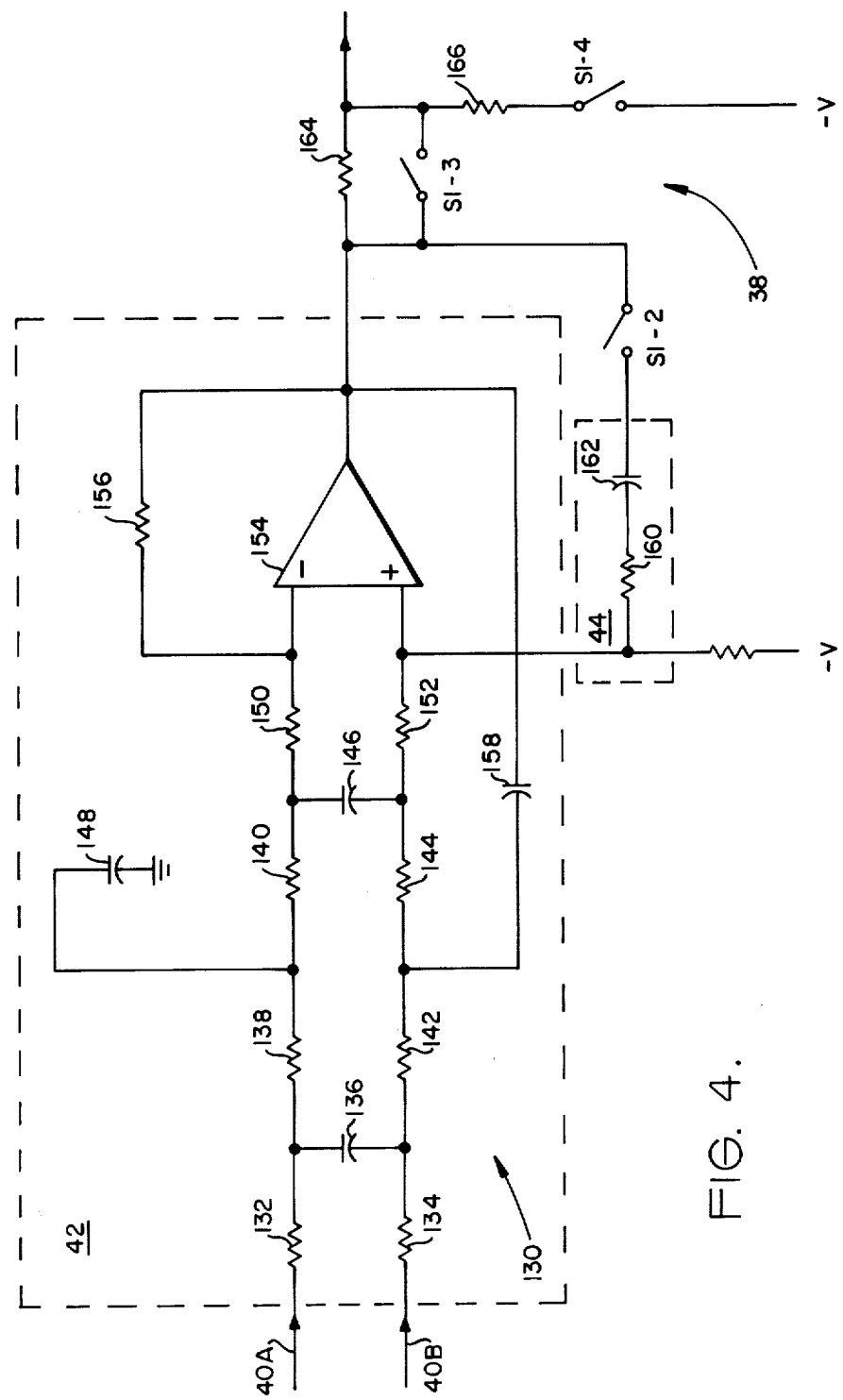
FIG. 4 is a schematic diagram of the transmit lowpass filter 42, network 44, switch 38, except for that portion designated as S1-1, and a resistor network in the form of an L-pad.

A more detailed schematic diagram of lowpass filter 42 is shown in FIG. 4, along with network 44, certain switch elements 38, and an L-pad consisting of resistors 164 and 166. With respect to filter 42, a balanced network 130 comprises resistors 132, 134, 138, 142, 140, 144, 150, and 152, and capacitors 136 and 146. A differential amplifier 154 has one input of the network 130 connected to the noninverting input, and the other output of network 130 connected to the inverting input. A feedback resistor 156 is connected between the output terminal of differential amplifier 154 and its inverting input terminal. A feedback capacitor 158 is connected between the output terminal of differential amplifier 154, and the junction of resistors 142, and 144 of network 130. As thus arranged, the device enclosed in the dotted lines, and numbered 42, is a voice frequency lowpass filter. When switch S1 is operated, network 44, consisting of resistor 160 and capacitor 162, is connected in the feedback path between the output terminal of differential amplifier 154 and the noninverting input terminal. To establish the correct operating level, the L-pad, consisting of resistors 164 and 166, is connected to the output terminal of differential amplifier 154 by means of switch 38 contacts S1-3 and S1-4. Because the output of the lowpass filter 42 would be in the form of a square wave, it would also be possible, and perhaps desirable, to connect a shaping network at the output of the differential amplifier 154, whenever the device is to be made to operate as an oscillator. Such a connection could be accomplished, such as is shown for the L-pad comprising resistors 164 and 166, but such an arrangement is not shown in the drawing.

Figure 5:
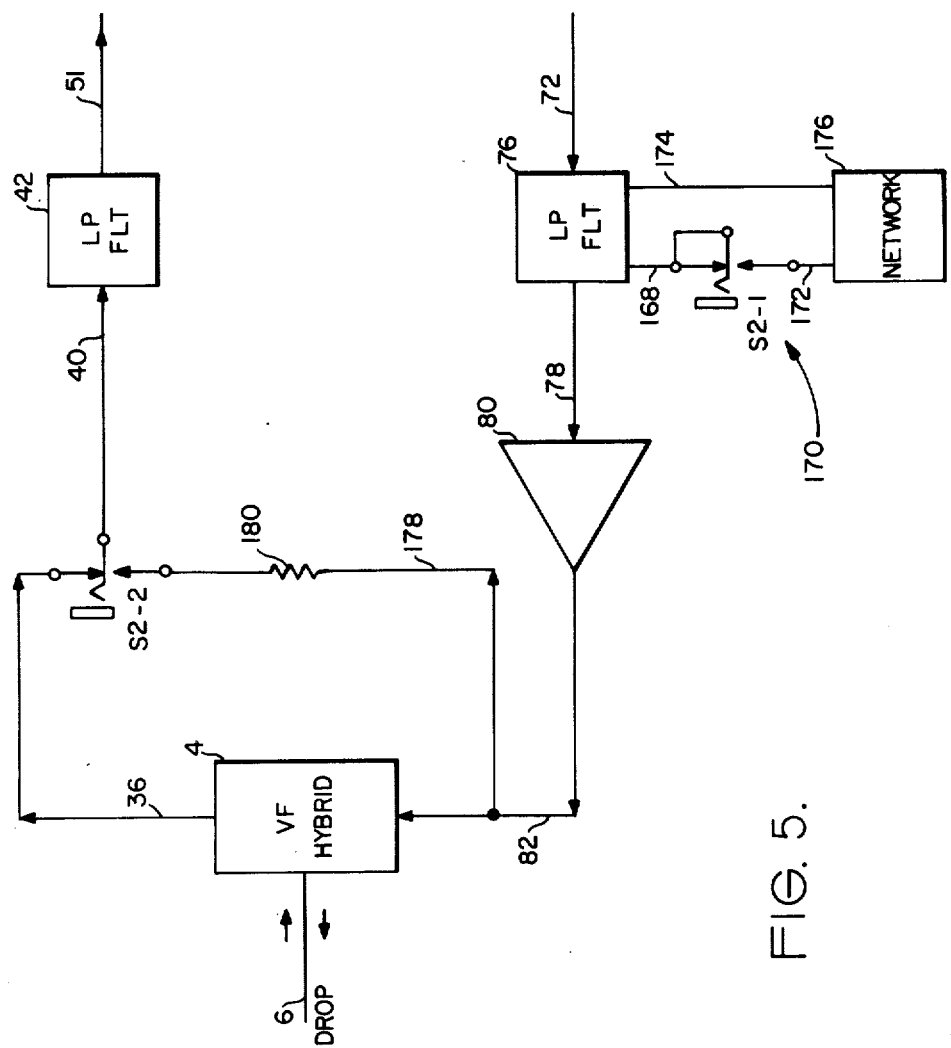
FIG. 5 shows a different arrangement for generating the test signal, in this case, using the receiving lowpass filter and a switch arrangement to bypass the hybrid, the bypass including a resistor for amplitude control.

It is also possible to use the receiving lowpass filter of the central office terminal to generate a first test signal. Such an arrangement is shown in FIG. 5 where only the elements necessary to illustrate such an arrangement are shown for the central office terminal. Items which are the same as those used in FIG. 2 have been given the same identification numbers. Thus, the relationship of the two is readily established. In this case, lowpass filter 42 in the transmitting branch of the channel operates only as a lowpass filter. The lowpass filter 76 in the receiving branch is now arranged so as to be connected to a network 176 via switch 170, which network is similar to that discussed for the transmitting lowpass filter, as shown in FIG. 4, and performs the same function, i.e., of converting lowpass filter 76 into an oscillator having a predetermined frequency with a predetermined output amplitude. Switch 170 has contacts S2-1 and S2-2. The contacts S2-1 connect filter 76 to the network 176 via paths 174, and 168-172. The switch contact S2-2 disconnects path 36 from path 40 to interrupt the hybrid transmission from the drop via path 6 and VF hybrid 4. At the same time, the switch contact S2-2 connects path 82 via path 178 and resistor 180 to path 40, and to the input of the lowpass filter 42 which is in the transmit branch. Resistor 180 is a level adjusting resistor so as to fix the amplitude at the proper level for 100% modulation of the carrier and, thus, to obtain the appropriate demodulated output level at the receiving terminal in order to trigger the threshold detection circuit 122.

Figure 6:
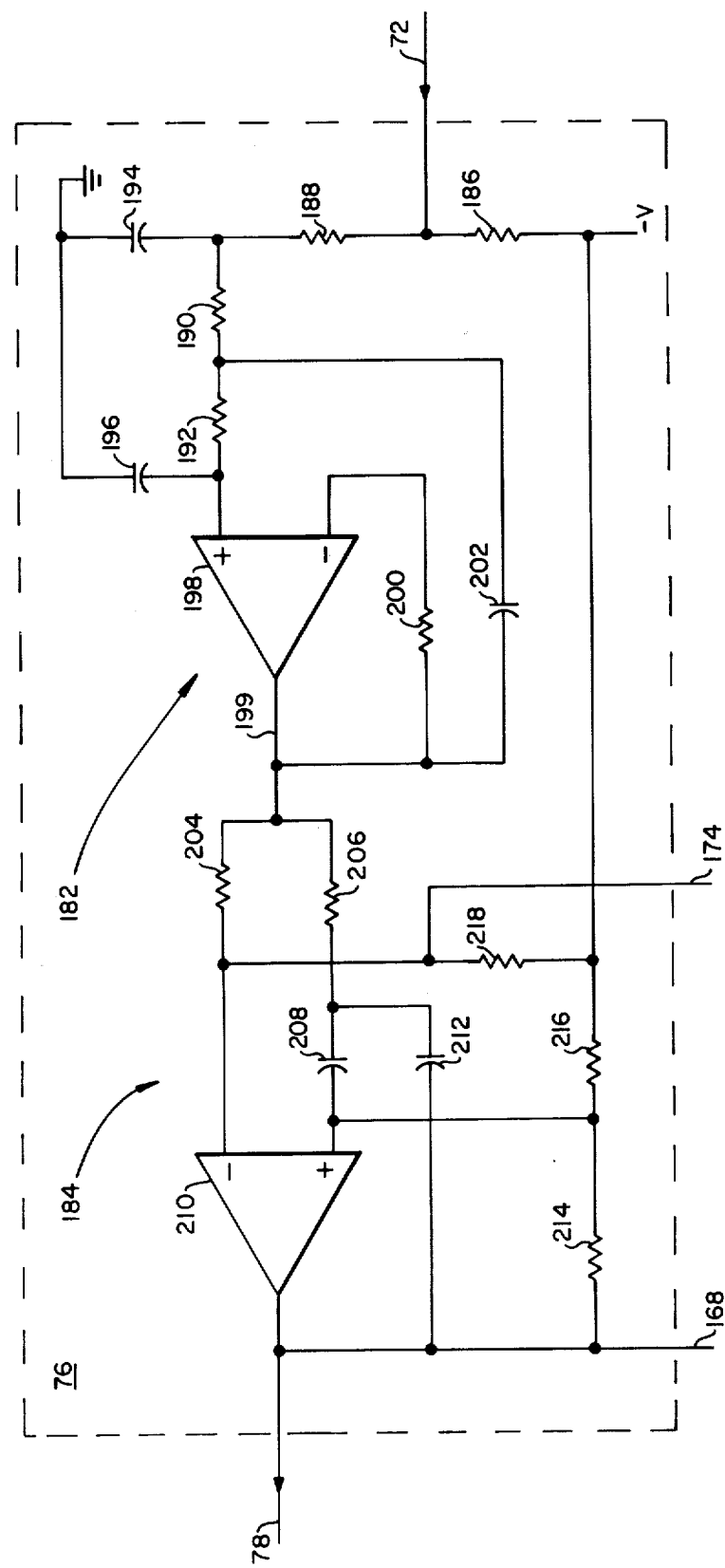
FIG. 6 is a schematic diagram of a typical receiving lowpass filter which would be used with the invention.

A schematic diagram of a receiving lowpass filter 76 is shown in FIG. 6. The input to the two-stage network is between path 72 and ground. Path 72 is connected to the first network stage 182 at the junction of resistors 186 and 188. The other terminal of resistor 186 is connected to the negative voltage supply, and the other terminal of resistor 188 is connected to the network consisting of resistors 190, 192 and capacitors 194 and 196, which network is then connected to the noninverting input of operational amplifier 198. A feedback resistor 200 is connected from the output terminal of operational amplifier 198 to the inverting input. A feedback capacitor 202 is connected between the output terminal of operational amplifier 198 and the junction of resistors 190 and 192. The second stage of filter 176 is shown as 184, which is connected to the output of the first stage via a resistance capacitance network consisting of resistors 204 and 206, and capacitor 208. Resistor 204 has one terminal connected to the output terminal of the differential amplifier 198, and has the other terminal connected to the inverting input of operational amplifier 210. Resistor 206 has one terminal connected to the one terminal of resistor 204, and the other terminal connected to one terminal of capacitor 208, which has its other terminal connected to the noninverting input of operational amplifier 210. Feedback capacitor 212 is connected between the output terminal of operational amplifier 210 and the junction of capacitor 208 with resistor 206. A resistance network consisting of resistors 214, 216, and 218 provide feedback to the inverting and noninverting networks as shown. The network 176, as shown in FIG. 5, is connected between terminals 168 and 174, and modify this feedback network whenever switch 170 is operated.

In the preferred embodiment of the invention, operation of the switch S2 converts the receiving lowpass filter 76 into an oscillator having a frequency of about 3 kHz. The level of the signal is adjusted so that a 100% modulated carrier is transmitted from the attended office to the subscriber station. At the station end following demodulation, the carrier component is filtered out by the lowpass filter 98 leaving as a voice frequency component the 3 kHz signal. This signal is fed both to the VF hybrid and to the threshold detector 122. As explained above in a properly operating loop, the first test signal will be high enough to trigger the threshold detector.

Figure 7:
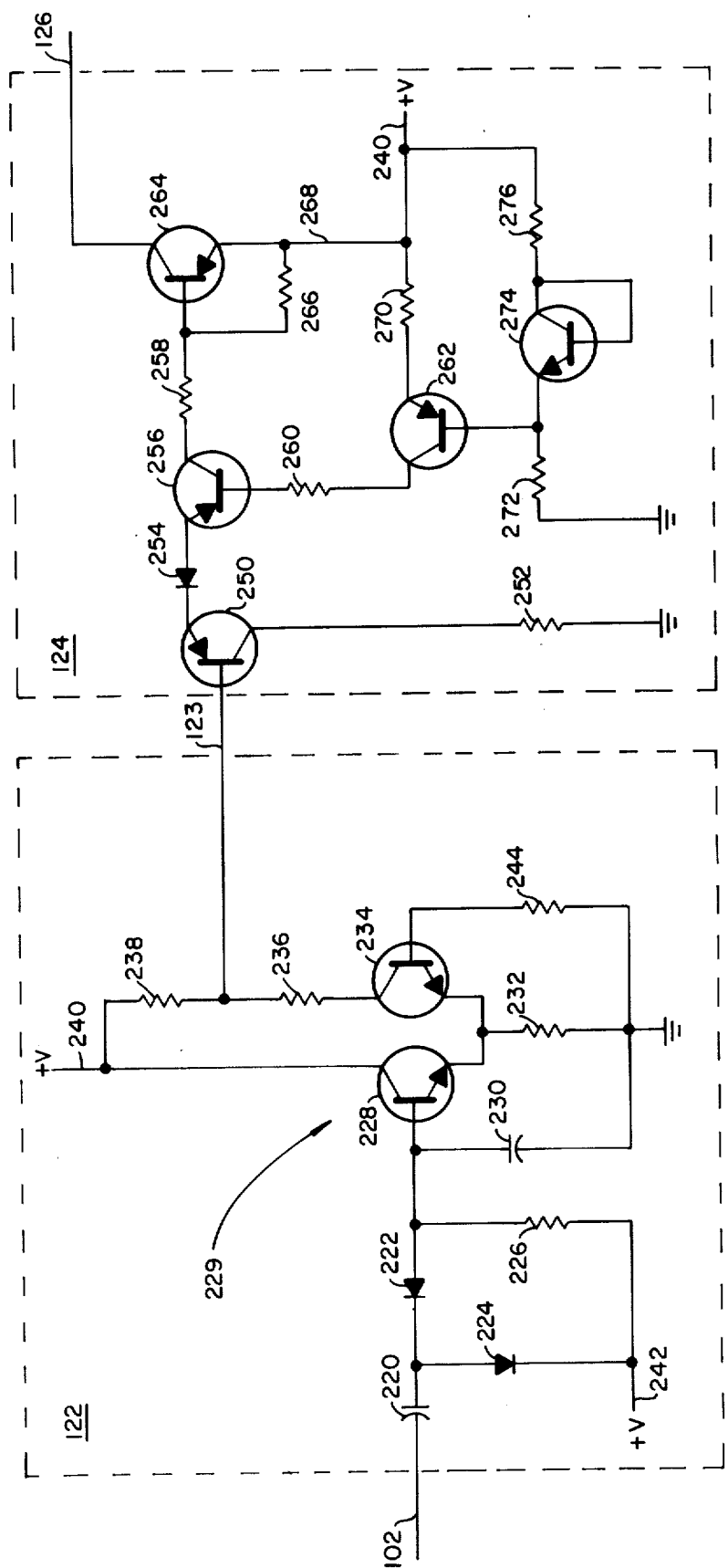
FIG. 7 is a schematic diagram of the threshold detector 122, station oscillator control 124, which are used at the station terminal end to simulate a closed loop drop condition.

Referring now to FIG. 7, it may be seen that this first test signal is applied via path 102 to the input terminal of threshold detector 122, which connects the input signal to a voltage doubler circuit consisting of capacitor 220, diodes 222 and 224, and resistor 226. The DC output component from the doubler is proportional to frequency. For the normal frequencies below about 2 kHz, the output from the rectifier-doubler is not high enough to trigger the differential amplifier 229, which is biased to provide a threshold level so that even the standard test tone levels employed in testing transmission paths will not exceed the threshold level. Differential amplifier 229 consists essentially of transistors 228, 236 and associated components. Such amplifiers are well known and, therefore, are not described further here. When the differential amplifier 229 is triggered by the test signal, the output voltage on path 123 changes the bias on transistor 250 in the station oscillator control unit 124. This turns on transistor 250 which in turn causes transistor 256 to conduct thus biasing the base of transistor 264, whereby transistor 264 is also turned on. The result is that a + voltage is applied from path 240 via 268, transistor 264 and path 126 to station oscillator 128, FIG. 3. It is well known that one means of controlling the station oscillator in such station carrier systems is to remove the operating voltage when the oscillator is to be turned off. The oscillator is turned on by applying the operating voltage when the subscriber station goes off-hook. Such a circuit arrangement is not shown here, but it is well understood by those of ordinary skill in the art. For the present invention, the presence of a proper level first test signal at the station terminal has caused an effective, i.e., artificial, seizure of the station drop circuitry and, thus, has turned on the station transmit oscillator by means of the threshold circuitry described above. However, the station drop hybrid is still open, i.e., the drop is unterminated, therefore, the return loss is low and the first test signal from the output of the receive lowpass filter 98 will pass over path 100 through VF amplifier 104, path 106 through the unterminated hybrid 108 along path 112 through amplifier 114, then to modulator 116 where it modulates the carrier frequency from station oscillator 128, passes through bandpass filter 118, path 120 to carrier line transformer 90, and then to path 32 back to the central office terminal 5 channel unit. The level of the first test signal transmitted from the central office terminal is about +10 dBm. This corresponds, as has been noted hereinabove, to a 100% modulated carrier. The frequency of this signal in the preferred embodiment is approximately 2950 Hz which corresponds to the resonant point of the filter. This frequency is essentially unchanged during transmission around the loop. However, when it is detected at the station terminal and passed through the VF hybrid and then modulated in modulator 116, the level that is transmitted from the station terminal is only about −10 dBm 0. Thus, the second test signal amplitude is different from that of the first test signal, but it has the same frequency.

What is claimed is:

1. Apparatus for loop testing of a carrier system channel having first and second terminal ends, the first terminal end including a lowpass filter, a first modulator and a first oscillator connected to an input of said first modulator, the second terminal end including a second carrier oscillator which is disabled when the VF drop is idle and a second modulator, said apparatus comprising:
    means for temporarily changing the characteristics of the lowpass filter so as to generate a first test signal having a predetermined amplitude higher than the signals normally present in the channel and at a frequency which is within the passband of the channel;
    means for applying said first test signal to the input of said first modulator so as to modulate the first carrier oscillator signal with said first test signal to obtain a first modulated carrier frequency signal for transmission to the second terminal end of the channel;
    means for recovering at said second terminal the first test signal from the modulated signal transmitted from said first terminal;
    means responsive to said recovered first test signal to energize said second carrier oscillator, whereby an artificial seizure of the drop is effected and the second carrier oscillator output signal is applied to an input of said second modulator and is transmitted via said second modulator to said first terminal end;
    means for applying the recovered test signal at reduced amplitude to another input of said second modulator to generate a second modulated test signal for transmission to said first terminal end; and
    means for determining if the carrier and reduced amplitude signals have been received at said first terminal end.

2. Apparatus in accordance with claim 1 wherein said lowpass filter is an active filter comprising:
    an operational amplifier having an inverting input terminal, a noninverting input and an output terminal; and
    network means connected to said inverting and noninverting input terminals and to the output terminal of said operational amplifier for deriving the lowpass filter transmission characteristics.

3. Apparatus in accordance with claim 2 wherein said temporarily changing means comprises:
    a two terminal RC network having one terminal connected to one input of said operational amplifier; and
    switching means for providing a voice frequency through path in one position and for interrupting the through path and connecting the other terminal end of said RC network to the output of said operational amplifier when in a second position.

4. Apparatus in accordance with claim 3 wherein said means for recovering said first test signal further comprises:
    demodulation means for recovering the modulation frequency from said modulated signal, having an input terminal connected to receive said modulated signals and providing the first test signal at an output terminal.

5. Apparatus in accordance with claim 4 wherein said means responsive further comprises:
    converting means for accepting and converting, exclusive of other modulation frequencies which may appear at the output terminal of said demodulation means, said first test signal into a control signal; and
    control means responsive to said control signal to energize said second carrier oscillator.

6. Apparatus in accordance with claim 5 wherein said converting means further comprises:
    a voltage doubler circuit having an input connected to receive the first test signal and providing a rectified signal at an output;
    a threshold detector circuit having an input terminal connected to the output terminal of said voltage doubler and providing the control signal at an output terminal only when the amplitude of the signal at the output of the voltage doubler is greater than a predetermined value; and
    gating means having an input terminal connected to the output terminal of said threshold detector circuit and having an output connected to the second carrier oscillator, whereby said oscillator is turned on whenever a control signal appears at the output terminal of said threshold detector.

7. In a carrier system including a first terminal end, a second terminal end and a loop transmission path interconnecting said first and second terminal ends, each terminal end having its own carrier oscillator, whereby there is a corresponding one of the first and second carrier oscillators at corresponding first and second terminal ends, said system at said first end also including a lowpass filter, apparatus for measuring the transmission path loss of the carrier system comprising:
    first means, at said first end when manually rendered responsive, for forming a signal generator with the lowpass filter to generate a first test signal having a predetermined amplitude at a selected frequency;
    a first modulator having one input connected to accept the first test signal and a second input connected to accept the output frequency of said first carrier oscillator, whereby a first modulated test signal is derived which propagates along said path to the second terminal end;
    second means at the second terminal end to demodulate the first modulated test signal to recover the first test signal;
    third means responsive to the recovered first test signal to energize the second oscillator;
    a v-f hybrid having separate transmit and receive paths on the four-wire side and a two-wire drop side, said hybrid having a low return loss when the drop is on-hook, thereby allowing a portion of said first test signal, i.e., a second test signal, to pass from the receive path to the transmit path;

a second modulator having one input connected to accept said second test signal from the transmit path of said hybrid, having a second input connected to receive the output carrier wave of said second carrier oscillator, the carrier wave of the second oscillator being modulated by the second test signal to produce a second modulated test signal, the second modulated test signal propagating in reverse direction along said path to the first terminal end;

fourth means at the first terminal end for demodulating the second modulated test signal to recover the second test signal; and means for measuring the amplitude of the second test signal to determine if the path loss is within tolerance.

8. Apparatus in accordance with claim 7 wherein said first means further comprises:

an active lowpass filter comprising:

an operational amplifier having an inverting input terminal, a noninverting input and an output terminal; and network means connected to said inverting and noninverting input terminals and to the output terminal of said operational amplifier for deriving the lowpass filter transmission characteristics;

a two terminal RC network having one terminal connected to one input of said operational amplifier; and switching means for providing a voice frequency through path in one position and for interrupting the through path and connecting the other terminal end of said RC network to the output of said operational amplifier when in a second position.

9. Apparatus in accordance with claim 8 wherein said third means further comprises:

detection means, having an input terminal connected to the output terminal of said second means and having an output terminal, for detecting the presence of said test signal exclusive of other modulation frequencies which may appear at the output terminal of said second means; and control means having an input terminal connected to the output terminal of said detection means and having an output terminal connected to actuate said second carrier oscillator, whereby the control means turns on the oscillator whenever the test signal is detected.

10. Apparatus in accordance with claim 9 wherein said detection means further comprises:

a voltage doubler circuit having an input connected to receive the test signal and providing a rectified signal at an output;

a threshold detector circuit having an input terminal connected to the output terminal of said voltage doubler and providing a signal at an output terminal only when the amplitude of the signal at the output of the voltage doubler is greater than a predetermined value; and gating means having an input terminal connected to the output terminal of said threshold detector circuit and having an output connected to the control terminal of said second carrier oscillator, whereby the oscillator is turned on whenever the threshold detector provides an output signal.

* * * * *